Dec. 31, 1929.  H. HOLZWARTH  1,741,939
COMBUSTION TURBINE
Filed Jan. 29, 1927
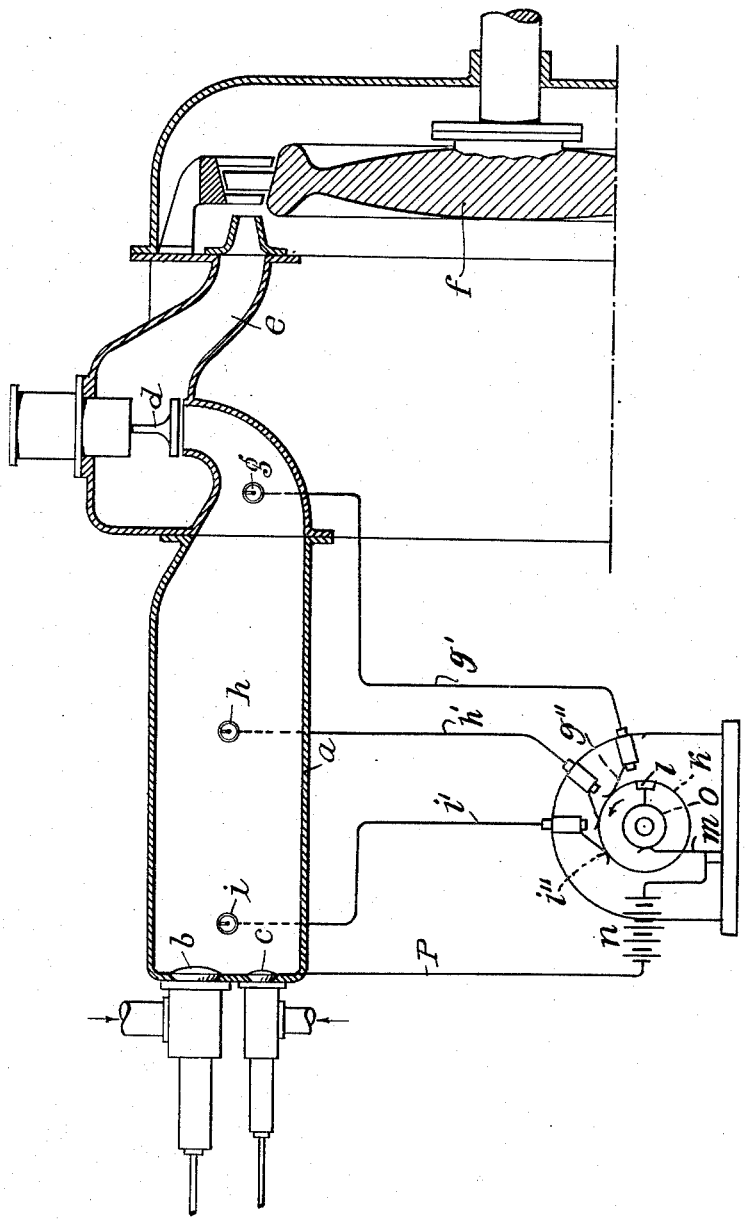
WITNESS
G. V. Rasmussen
INVENTOR
HANS HOLZWARTH
BY
Meserve Schrenk
ATTORNEYS Patented Dec. 31, 1929

1,741,939

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

COMBUSTION TURBINE

Application filed January 29, 1927. Serial No. 164,626.

My invention relates to combustion turbines and more particularly to turbines of this class which are of large horse power and include combustion chambers of large dimensions. The object of the present invention is to provide a novel method and arrangement whereby the complete fuel charge in th combustion chamber will be fully exploded at the predetermined favorable moment in the operative cycle of the turbine to develop maximum operative efficiency and without creating lingering after explosions. A further object of the invention is to provide a method and construction whereby the development of pressure waves resulting from improper ignition, and consequent sudden pressure increases, which are not favorable to the regulated operative cycle and the practical maintenance of the turbine are avoided. Other objects will appear from the description hereinafter and the features of novelty will be pointed out in the claims.

The accompanying drawing, diagrammatically illustrates an example of the invention without defining its limits, the view being a fragmentary section of a combustion turbine.

In the drawing $a$ represents the combustion chamber of a combustion turbine of relatively large horse power, the combustion chamber being of elongated form and of relatively large internal dimensions. At one end the chamber $a$ is provided with an air inlet valve $b$ and a fuel valve $c$ which are automatically operated in any conventional manner to control the supply of air and gas, or in other words the fuel charge, to the chamber $a$. At its opposite end the chamber $a$ is provided with a nozzle valve $d$ of any suitable form which controls the communication between the chamber $a$ and the nozzle $e$; the latter is located in operative relation to the blades of the turbine rotor $f$ in the well known way. As so far described the construction and arrangement of the turbine may be of any conventional and well known type.

As shown in the illustrated example a plurality of ignition devices $g$, $h$ and $i$, such as electrically controlled spark plugs or the like, are provided in the combustion chamber $a$. The arrangement of these ignition devices is preferably such that the initial device $g$ is located in proximity to the nozzle valve $d$, the intermediate device $h$ in the vicinity of the transverse center of said chamber $a$ and the final device $i$ in proximity to the inlet valves $b$ and $c$. The ignition devices $g$, $h$ and $i$, which, as previously stated, may be spark plugs operated by means of high tension electric currents, the latter being controlled by means of conventional controlling devices to force the devices in periodic sequence beginning with the initial device $g$, following with the intermediate device $h$ and ending with the final device $i$. The ignition sequence is such that the complete fuel charge is exploded in a series of explosions which follow each other at predetermined intervals; for instance, the initial explosion takes place at the device $g$ and is followed from 1/100 to 1/200 of a second later by an intermediate explosion at the device $h$, which in turn is followed from 1/100 to 1/200 of a second later by a final explosion at the device $i$.

A device for effecting the desired successive ignition of the three spark plugs arranged within the chamber is schematically illustrated in the drawing. The three spark plugs $g$, $h$ and $i$ are connected by lead wires $g'$, $h'$, $i'$ to three contacts $g''$, $h''$, $i''$ flexibly conected to a revolving insulated disc $k$. To the surface of the disc $k$ is attached a contact piece $l$ connected with concentric commutator rings $o$ against which a spring contact $m$ bears. The contact $m$ is, in turn, connected to a source of current $n$ from which a return conductor $p$ leads to the body of the machine. The source of current may be an electrical energizing unit of any ordinary construction, high tension magnetos such as Bosch or Lodge being preferred. These high tension magnetos are provided with timing levers, which allow of timing the ignition devices independently from each other. In the specific ignition arrangement described above, when the insulated disc $k$ is revolved in the direction indicated by the arrow shown on the drawing, the contact piece $l$ comes successively into contact with the springs of the contacts $g''$, $h''$, $i''$, from which the current is communicated through wires $g'$, $h'$, $i'$ to the spark plugs $g$, $h$ and $i$ effecting the ignition of the latter in series depending upon the speed of the disc $k$ or the distance between the contacts $g''$, $h''$, $i''$ upon its surface. The initial explosion at $g$ spreads rearwardly and exerts a compressive action upon the intermediate and final portions of the fuel charge and thereby raises the temperature thereof and thus increases the combustibility of said intermediate and final portions of the charge. The spark at $h$ accordingly encounters a highly favorable prepared mixture which is quickly and completely exploded to provide an intermediate explosion. The efficiency of operation is still further increased at this point due to the fact that this intermediate explosion spreads toward the inlet valves $b$ and $c$ and adds to the compression of the final portion of the charge and accordingly raises the temperature and combustibility thereof to a still higher point. The spark at $i$ accordingly finds a still more highly prepared mixture which is quickly exploded as a final charge to complete the explosion of the entire charge in the chamber $a$. Complete explosion and combustion of the entire charge, even if fuels of poor quality and slow burning are utilized, is assured and a maximum operative efficiency is at all times provided. With the arrangement illustrated and described the opening moment of the nozzle valve may vary without interference with the efficiency of operation of the turbine. For instance, the opening of said valve $d$ may take place during the progress of the explosion or immediately when the complete explosion takes place or a short time after the complete explosion. With the arrangement set forth, the ignition of the fuel mixture may be carried out in firing sequence in predetermined regulated periods to secure the best results.

Various changes in the specific form shown and described may be made within the scope of the claims without departing from the spirit of the invention.

I claim:

1. The method of exploding a continuous body or an explosive mixture of fixed volume confined within a space having an outlet, which comprises igniting in sequence portions of such mixture successively more remote from said outlet whereby the expanding products of combustion of each such portion effect compression of the remaining portion or portions of the mixture prior to the ignition thereof.

2. The method of exploding a continuous body of an explosive mixture of fixed volume confined within a space having an outlet, which comprises igniting first the portion of said mixture adjacent said outlet, whereby the expanding products of the combustion of such portion effect compression of the remainder of said mixture, then igniting a portion of said mixture more remote from said outlet, and finally causing the combustion gases to escape through said outlet.

In testimony whereof I have hereunto set my hand.

HANS HOLZWARTH.